(12) United States Patent
Francischetti

(10) Patent No.: US 7,631,946 B2
(45) Date of Patent: Dec. 15, 2009

(54) METHOD FOR MANUFACTURING A WHEEL INCLUDING CENTERING A WHEEL RIM ON A WHEEL DISC, AND A WHEEL PRODUCED BY THE METHOD

(75) Inventor: Evandro Luis Francischetti, Jardim Sao Roque (BR)

(73) Assignee: Arvinmeritor do Brasil Sistemas Automotivos Ltda., Limeira-SP (BR)

( * ) Notice: Subject to any disclaimer, the term of this patent is extended or adjusted under 35 U.S.C. 154(b) by 279 days.

(21) Appl. No.: 10/513,690

(22) PCT Filed: Apr. 28, 2003

(86) PCT No.: PCT/BR03/00062

§ 371 (c)(1),
(2), (4) Date: Jun. 3, 2005

(87) PCT Pub. No.: WO03/095127

PCT Pub. Date: Nov. 20, 2003

(65) Prior Publication Data

US 2005/0252004 A1    Nov. 17, 2005

(30) Foreign Application Priority Data

May 8, 2002    (BR)    .................................... 0201684

(51) Int. Cl.
*B60B 3/10*    (2006.01)
(52) U.S. Cl. ............................ 301/63.104; 301/63.103; 301/63.106; 29/894.322
(58) Field of Classification Search ............ 301/63.101, 301/63.103, 63.104, 95.101, 63.105, 63.106; 29/894.321, 894.322, 894.35
See application file for complete search history.

(56) References Cited

U.S. PATENT DOCUMENTS

| | | | | | |
|---|---|---|---|---|---|
| 3,506,311 | A | * | 4/1970 | Nobach | 301/63.105 |
| 4,610,482 | A | * | 9/1986 | Overbeck et al. | 301/63.105 |
| 5,257,455 | A | * | 11/1993 | Iwatsuki | 29/894.323 |
| 5,421,642 | A | * | 6/1995 | Archibald | 301/65 |
| 5,435,632 | A | * | 7/1995 | Gajor et al. | 301/63.105 |
| 5,490,720 | A | * | 2/1996 | Archibald | 301/35.621 |
| 5,558,407 | A | * | 9/1996 | Jaskiery | 301/63.105 |
| 5,634,694 | A | * | 6/1997 | Murray et al. | 301/63.103 |
| 5,639,147 | A | * | 6/1997 | Hill et al. | 301/63.107 |
| 5,803,553 | A | * | 9/1998 | Wei | 301/63.107 |
| 6,007,158 | A | * | 12/1999 | Maloney et al. | 301/37.43 |

(Continued)

FOREIGN PATENT DOCUMENTS

JP    3-125602    *    5/1991

(Continued)

*Primary Examiner*—Russell D Stormer
(74) *Attorney, Agent, or Firm*—Alston & Bird LLP

(57) ABSTRACT

The invention relates to a method of manufacturing a wheel, particularly for use on automotive vehicles. The wheel has a wheel rim and a wheel disc connectable to each other. The method includes shaping the wheel disc, shaping the wheel rim, manufacturing the wheel disc to form a first centering element and manufacturing the wheel rim to form a second centering element. The centering elements allow the wheel disc and the wheel rim to be connectable to each other via the first and second centering elements in a centered or concentric way.

25 Claims, 2 Drawing Sheets

U.S. PATENT DOCUMENTS

| | | | |
|---|---|---|---|
| 6,024,415 A * | 2/2000 | Stach | 301/64.102 |
| 6,029,351 A * | 2/2000 | Cvijanovic | 29/894.323 |
| 6,030,051 A * | 2/2000 | Hosoda et al. | 301/63.105 |
| 6,036,280 A * | 3/2000 | Stanavich | 301/63.103 |
| 6,213,563 B1 * | 4/2001 | Heck et al. | 301/63.105 |
| 6,293,630 B1 * | 9/2001 | Separautzki et al. | 301/64.203 |
| 6,447,071 B1 * | 9/2002 | Griffin | 301/63.104 |
| 6,491,351 B1 * | 12/2002 | Mikami | 301/63.101 |
| 6,508,517 B2 * | 1/2003 | Mikami | 301/63.103 |
| 6,769,743 B1 * | 8/2004 | Aasen et al. | 301/63.104 |

FOREIGN PATENT DOCUMENTS

| | | | |
|---|---|---|---|
| WO | WO 98/41410 | * | 9/1998 |

\* cited by examiner

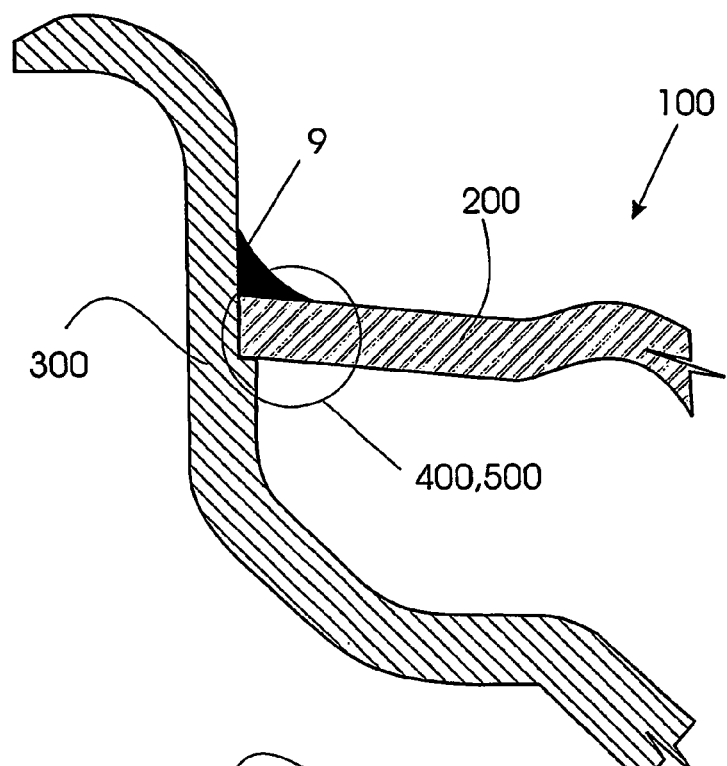
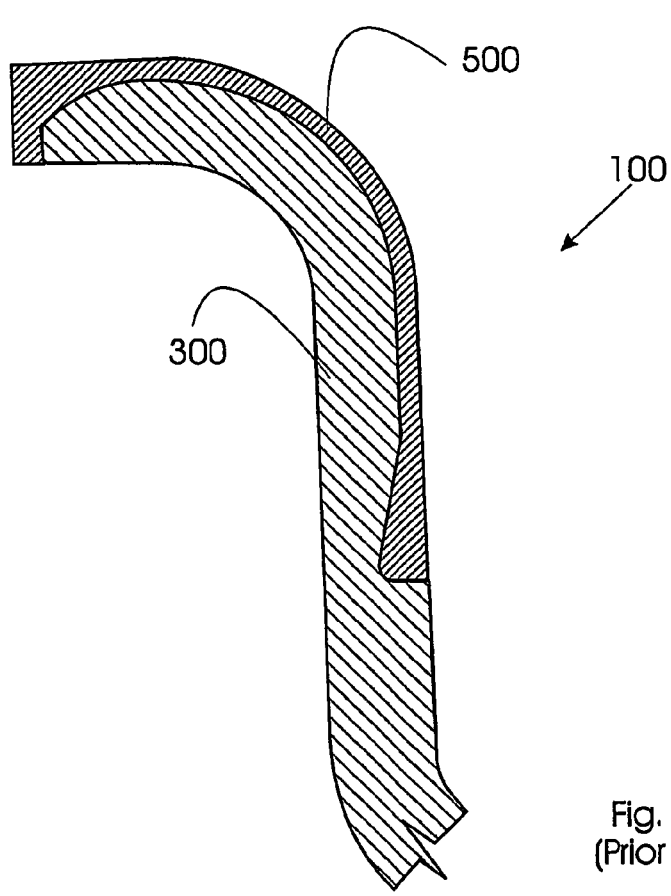
Fig. 1 (Prior art)
Fig. 2 (Prior art)

METHOD FOR MANUFACTURING A WHEEL INCLUDING CENTERING A WHEEL RIM ON A WHEEL DISC, AND A WHEEL PRODUCED BY THE METHOD

REFERENCE TO RELATED APPLICATIONS

The application claims priority to PCT Application No. PCT/BR03/00062, which was filed on Apr. 28, 2003, which claims priority to Brazilian patent application no. PI0201684-2, which was filed on May 8, 2002.

TECHNICAL FIELD

The present invention relates to a method of manufacturing a wheel, particularly for use on vehicles. The wheel has a recess for connecting the wheel rim to the wheel disc without the need for additional manufacturing steps.

BACKGROUND OF THE INVENTION

Conventional stamped-steel wheels comprise a cylindrical wheel rim defining an inner wall and a substantially circular stamped wheel disc connected to the rim at an intermediate point of the rim's inner wall. The main characteristics of this type of conventional wheel are its low manufacturing cost and its attractive appearance. With the passing of time and the sophistication of the vehicle market, especially light-weight commercial and utility automobiles, the use of these conventional wheels has been reduced to low-cost vehicles or vehicles used in commercial applications where the use of wheels cast from light-metal alloys and having a more elaborate appearance and a much higher manufacture cost is not desirable or economically feasible.

To provide wheels that have a low manufacturing cost and an attractive appearance, wheels have been developed with a stamped disc having a diameter that is the maximum diameter of the wheel and fixed at the wheel rim's back surface. This style of wheel is much more attractive than conventional stamped wheels, and the manufacturing cost continues to be reduced so that wheels of this style have great potential in the consumer market.

In spite of having an attractive appearance, the question of centering the rim while fixing the rim to the disc presented difficulties. It is necessary to position the rim very carefully to fix it to the disc. Typically, the rim is fixed to the disc by welding in order to avoid manufacturing concentric wheels, which may cause uncontrollable vibrations when the vehicle moves if the wheels are off-center.

In order to facilitate centered fixation between the disc and the rim, a number of solutions have been proposed, generally constituted by concentric channels or recesses made in the disc by cutting tools. The free end of the rim is then positioned in the channels or recesses and welded. To make this preliminary fitting more precise, rims have been developed with the free end being specifically prepared by using a cutting tool.

In spite of achieving their objectives, these solutions result in additional manufacturing steps, incurring a higher production cost due to the need for additional machinery and personnel, wear of the cutting tools, material waste, and added time spent producing the wheel. Moreover, the larger the number of steps for manufacturing the wheel increases the chances of manufacturing flaws.

In this regard, U.S. Pat. No. 4,610,482 discloses a wheel provided with a rim associated with the upper surface of a disc. The upper surface of the disc is shaped in a mechanical shaping to remove material, forming a cavity in the region where the rim is associated. Additionally, in this wheel the free end of the rim also undergoes a similar shaping process by means of a cutting tool, which brings about a perfect fit between the disc and the rim. In addition, a surface is configured to serve as a stop for indicating a perfect fitting. As expected, this wheel has a considerably high manufacturing cost due to the large number of steps required for manufacturing the wheel.

Brazilian patent application PI 9916810, corresponding to PCT US99130165, discloses a wheel rim having a free end turned inward, defining a flange. The flange surface interfaces with the disc and is completely parallel to the corresponding disc surface to allow correct centering. Although less effective than the structure disclosed in the document discussed in the preceding paragraph, similar solutions may further be found in document US 2001/0038238.

Thus, there is a desire for a wheel that allows centering of the rim on the disc without requiring additional manufacturing steps.

SUMMARY OF THE INVENTION

The present invention has the objective of providing a method of manufacturing a wheel that has a disc with a centering element for fixing a rim in the correct position without requiring additional manufacturing steps. Also, the invention has the objective of providing a wheel and a wheel disc obtained by the manufacturing method disclosed herein.

The objectives of the present invention are achieved by means of a method of manufacturing a wheel, particularly for use on automotive vehicles, the wheel comprising a wheel rim and a wheel disc connectable with each other.

The method of producing the wheel includes shaping the wheel disc, shaping the wheel rim, manufacturing a wheel disc to form a first centering element and manufacturing a wheel rim to form a second centering element.

In one embodiment, the first centering element is an annular recess in the wheel disc and the second centering element is an annular projection in the wheel rim. The annular recess engages the annular projection to center the wheel rim on the wheel disc. The wheel rim and wheel disc are fixed together by welding.

The present invention has the advantage of enabling one to manufacture a stamped wheel composed of a wheel disc and a wheel rim, which may be easily arranged in a centered or concentric way, by virtue of the centering elements. The centering elements may be made during the mechanical shaping of the wheel rim and the wheel disc. Subsequent manufacturing steps are dispensed with, which results in lower manufacturing costs for the wheel.

These and other features of the present invention can be best understood from the following specification and drawings, the following of which is a brief description.

BRIEF DESCRIPTION OF THE DRAWINGS

The present will now be described in greater detail with reference to an embodiment represented in the drawings. The figures show:

FIG. 1 is a schematic cross-section view of a stamped wheel of the prior art;

FIG. 2 is a schematic view of the wheel illustrated in FIG. 1 in an intermediate step of its manufacturing method before completion;

DETAILED DESCRIPTION OF THE EMBODIMENT

Figure 3:
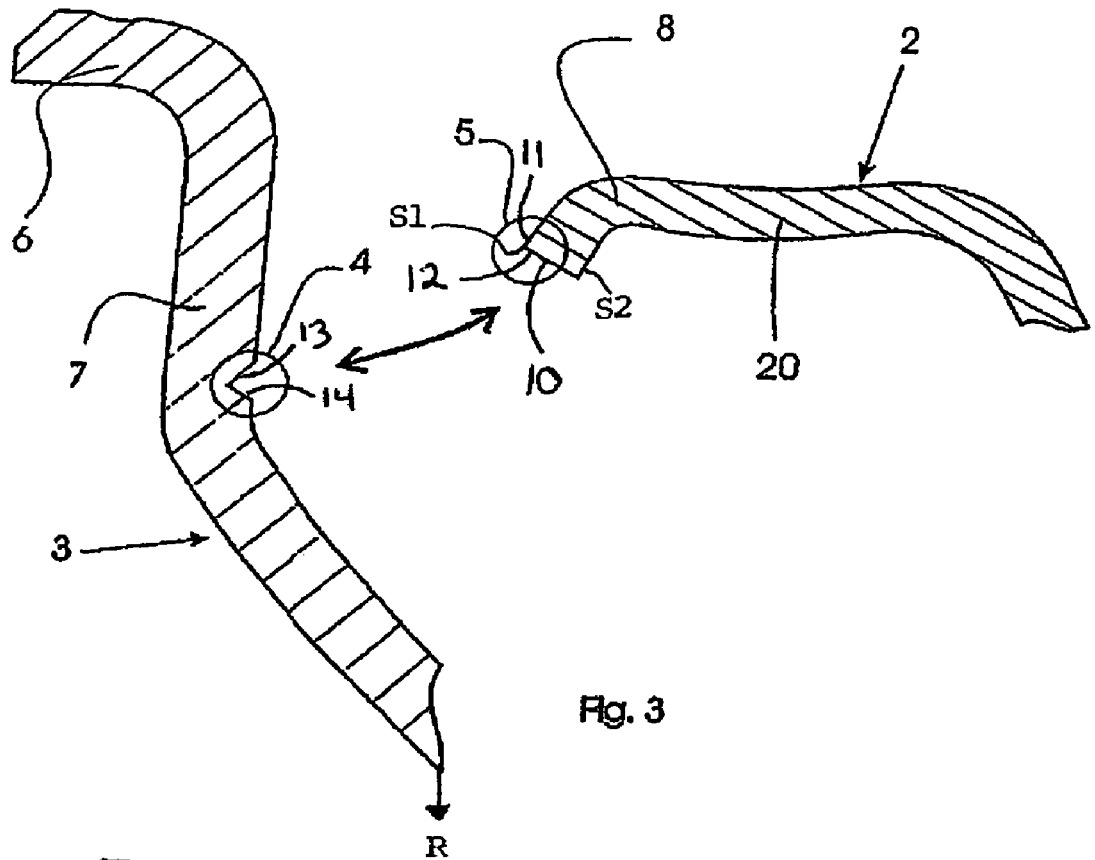
FIG. 3 is a schematic cross-section view of the wheel disc and wheel rim of the present invention, before the disc and rim are connected together.
Figure 4:
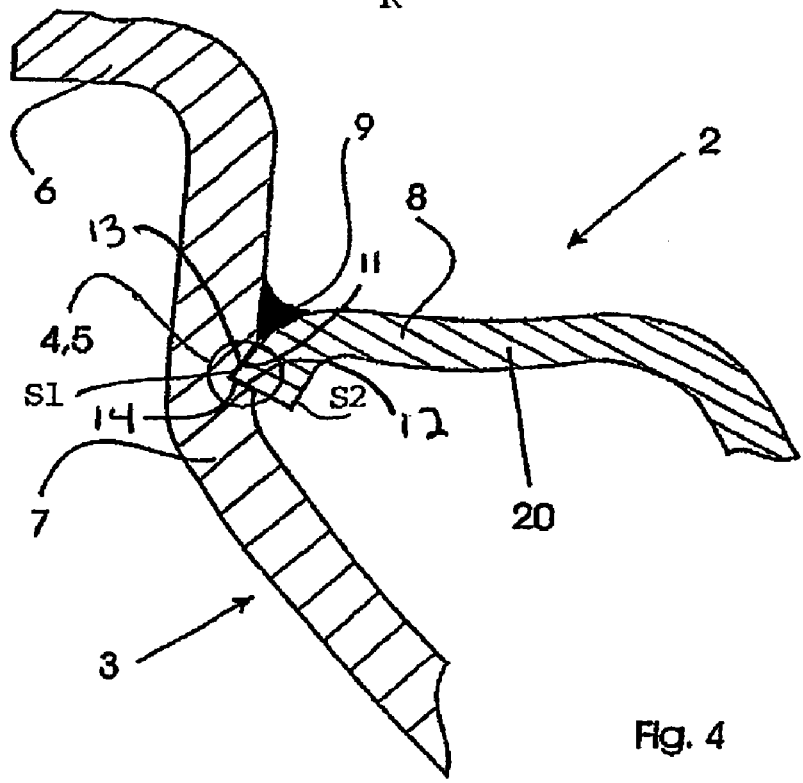
FIG. 4 is a schematic cross-section view of the wheel of the present invention, after the disc and rim are connected together.

According to one embodiment shown in FIGS. 3 and 4, an integrated wheel of the present invention comprises a substantially circular wheel disc 3 to which a substantially cylindrical or truncated cone-shaped wheel rim 2 is fixed. The wheel rim 2 has a first free end 8 and a first wheel flange (not shown). Preferably, the wheel rim 2 has a substantially truncated cone-shape.

The wheel flange of the wheel rim 2 protrudes from the wheel rim and has a substantially J-shaped curved profile. The wheel flange free tip being substantially perpendicular to the rest of the wheel flange body.

In one embodiment, the wheel rim 2 is made from carbon steel, being obtained by a mechanical shaping step. However, the wheel rim 2 may be made in other ways as well as built from materials other than carbon steel and may have shapes other than cylindrical or truncated-cone shapes. The only requirement is that the wheel rim 2 enables one to build the wheel described.

The first free end 8 of the wheel rim 2 extends from the wheel rim side wall 20 and defines a substantially annular surface with an upper portion S1 and a lower portion S2. In the preferred embodiment, the first free end 8 is slightly facing the inside of the wheel rim 2 and has a substantially pointed end, configuring a centering element. The centering element preferably has an annular projection 5 having a triangular cross-section. As shown in FIG. 3, an outer annular surface at S1 and an inner annular surface at S2 are interconnected by an edge 10 with the annular projection 5 having a first surface 11 formed as part of the outer annular surface and a second surface 12 formed as part of the edge 10. It is in reality an angular piece, constituted by the wheel rim 2 itself, without the need for any other step of mechanical shaping. However, the centering element may have other shapes, sizes and/or configurations (e.g. a segmented shape) that enable it to function in the manner explained below.

The wheel disc 3 is preferably substantially cylindrical and may be made from carbon steel by the stamping process. The wheel disc 3 has an end region 6 that embraces the wheel disc free end. A second wheel flange analogous to that of the wheel rim 2 projects from the wheel disc free end.

The wheel disc 3 further has an association region 7 adjacent to the end region 6. The association region 7 comprises a centering element that is preferably a recess 4 having a substantially triangular cross-section, to cooperate with the projection 5 of the wheel rim 2 such that the lower portion S2 does not contact the wheel disc 3 as shown in FIG. 4. As shown, the first surface 11 is fitted against a first surface 13 of the recess 4 and the second surface 12 is fitted against a second surface 14 of the recess 4 that is interconnected to the first surface 13. The first 13 and second 14 surfaces respectively comprise radially outer and radially inner surfaces that are obliquely orientated relative to an inboard surface of the association region 7 as shown in FIG. 3. Of course, the association region 7 may be located at another point, for instance close to the wheel disc end or positioned in a more central location.

Preferably, the recess 4 is substantially annular; however, it may be segmented or have another shape/geometry or amount. The only basic requirement is that the recess 4 cooperates with the projection 5. That is to say, the projection 5 and the recess 4 should engage each other.

Another requirement is that both the recess 4 and the projection 5 are concentric with the rest of the wheel disc 3 and the wheel rim 2, respectively. This condition is indispensable to characterize these two elements as centering elements. If the connection between the wheel disc 3 and the wheel rim 2 is conducted in an eccentric fashion, the resultant wheel is inherently unbalanced, and cannot not be used; otherwise, vibrations and loss of control of the vehicle equipped with the eccentric wheel may occur. In short, a wheel having an eccentric connection between the wheel disc 3 and the wheel rim 2 is a product that should be obligatorily rejected or reworked.

For merely descriptive purposes, the recess 4 located in the wheel disc 3 will be called a first centering element, and the projection 5 of the wheel rim 2 will be called a second centering element.

After the correct positioning between the recess 4 and the projection 5, preferably fitted to each other, a fixation between the wheel rim 2 and the wheel disc 3 is necessary so that the wheel can be stabilized. Preferably, fixation is effected by depositing a weld cord 9. One may evidently use other joining elements such as screws, rivets, adhesives, etc. In short, both the first the second centering elements play the role of a template, facilitating the correct positioning between the wheel disc 3 and the wheel rim 2 before they are connected together.

By way of description only, the wheel flange located on the wheel disc 3 constitutes the region where the wheel disc diameter is maximum. The two wheel flanges and the side wall 20 of the wheel rim 2 define a groove (not shown) into which a tire (not shown) is placed so that the side wall of the tire close to the wheel rim 2 opening is supported by the two wheel flanges. Because the wheel flanges have the profile described above, and because they project from the end region of the wheel rim 2 and of the wheel disc 3, they are substantially annular in shape.

Additionally, in spite of not being detailed in the figures, the disc 3 has a central region R associable to a wheel hub of the vehicle, preferably by at least one bore for inserting a wheel screw. Optionally, a concentric bore may be used to enable positioning of the tip of the vehicle axle (not shown). Further preferably, but not obligatorily, aesthetic and functional windows are provided to contribute to the ventilation of the brakes and to improve the appearance of the wheel.

The method of manufacturing the wheel of the present invention comprises a number of steps, which are listed below:

(i) shaping the wheel disc 3, which, as already mentioned, is preferably but not obligatorily carried out by stamping;

(ii) shaping the wheel rim 2, which, as already mentioned, is preferably but not obligatorily carried out by mechanical shaping;

(iii) connecting the first centering element(s) on the wheel disc 3 and the second centering element(s) on the wheel rim 2; and (iv) conducting final engagement between the wheel disc 3 and the wheel rim 2.

In the method described here, both the first and the second centering elements, which are preferably the recess 4 and the projection 5, are made during the process of shaping the wheel disc 3 and the wheel rim 2, respectively. This means that, in the preferred case, the recess 4 is configured in the stamping piece that will form the wheel disc 3, while the projection 5 is configured in on equipment that will form the wheel rim 2. There is no obligatory order for shaping the wheel disc 3 and the wheel rim 2. The wheel disc 3 and the wheel rim 2 may be shaped at the same time or both steps may occur independently, producing the wheel disc 3 and the wheel rim 2, which only then will be joined to facilitate the carrying-out of the subsequent steps (iii) and (iv).

The step (iii) of connecting the disc and the rim together comprises positioning and fitting the projection 5 into the recess 4, positioning the wheel rim 2 on the wheel disc 3 concentrically so as not to require any other means for correctly positioning both components.

Finally, the step (iv) of final connection between the wheel disc 3 and the wheel rim 2 preferably comprises welding these components to each other by means of a welding cord 9. Other procedures may be used in this step, such as fixation by means of screws, rivets, fitting, using adhesives or other means.

Preferably, but not obligatorily, the step (i) of the method of manufacturing wheels described here shape the wheel disc 3 and locate the recess 4 in a substantially intermediate association region 7 of the wheel disc 3 as already described before.

Also preferably, the step (ii) of the method of manufacturing wheels described here shapes a wheel rim 2, the projection 5 of which is located in a free end region of the wheel rim 2, which has also been mentioned before. However, this positioning of the projection 5 is not required in the invention.

FIGS. 1 and 2 show an integrated wheel 100 of the prior art, which comprises a rim 200 and a disc 300 joined to each other by a welding cord 9. As can be seen in the drawings, additional manufacturing steps are necessary to make the recess 400 and the rim projection 200. FIG. 2 shows the portion of material 500 that should be removed from the wheel during its manufacture, which may be achieved by using a cutting tool. The disadvantages of this system are explained above.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of manufacturing a wheel comprising:
    a) stamping a wheel disc to have an association region transitioning between an end region and a central region;
    b) shaping a wheel rim; and
    c) manufacturing the wheel disc to form at least one first centering element and manufacturing the wheel rim to form at least one second centering element wherein the wheel rim includes a side wall, and including stamping the at least one first centering element as a substantially annular recess having radially outer and radially inner surfaces defined by at least one stamped surface that is obliquely orientated relative to an inboard surface of the association region, and forming the second centering element as an angular piece extending downwardly at an angle from the side wall to be fitted into the substantially annular recess to contact both of the radially outer and radially inner surfaces to hold the wheel rim fixed relative to the wheel disc in a centered position relative to the wheel disc.

2. The method according to claim 1, wherein step b) comprises mechanically shaping the wheel rim.

3. The method according to claim 1, including locating the substantially annular recess in the association region of the wheel disc.

4. The method according to claim 1, further comprising locating the angular piece in a free end region of the wheel rim with the angular piece extending inwardly at an angle toward a wheel axis of rotation.

5. The method according to claim 1 wherein the substantially annular recess and the angular piece have corresponding cross-sectional shapes, and further comprising fitting the angular piece into the substantially annular recess to fix the wheel rim in the centered position relative to the wheel disc by preventing upward and downward vertical movement of the angular piece relative to the wheel disc.

6. The method according to claim 5, further comprising welding the wheel disc to the wheel rim at a weld attachment interface after fixing the wheel rim in the centered position wherein the weld attachment interface is external to the annular recess.

7. The method according to claim 5 including forming the substantially annular recess and the angular piece to each have triangular cross-sections that correspond in size to each other such that the angular piece can be fitted into the substantially annular recess to hold the wheel rim fixed relative to the wheel disc in the centered position.

8. The method according to claim 1, wherein the wheel is rotatable about an axis and including forming the angular piece with a distal tip that extends toward the axis at an angle that is oblique to the side wall.

9. The method according to claim 8 wherein the distal tip is defined by an outer rim surface and an edge rim surface that cooperate to define a triangular cross-section, and including forming the annular recess to correspond in shape to the triangular cross-section such that a portion of the edge rim surface remains exposed when the first and second centering elements engage each other.

10. The method according to claim 1 wherein the wheel disc is rotatable about a horizontally extending axis and wherein the association region extends in a generally vertical direction relative to the horizontally extending axis, and including comprising the radially outer and radially inner surfaces of the substantially annular recess as first and second interconnected stamped surfaces that are each obliquely orientated relative to the inboard surface of the association region.

11. The method according to claim 10 wherein the wheel rim has an outer annular surface and an inner annular surface that are interconnected by an edge, and wherein the second centering element comprises a triangular projection formed as part of the angular piece, the triangular projection extending at an oblique angle relative to the horizontally extending axis and being defined by a first surface formed as part of the outer annular surface and a second surface formed as part of the edge, and including fitting the first surface to directly contact one of the first and second interconnected stamped surfaces and fitting the second surface to directly contact the other of the first and second interconnected stamped surfaces.

12. The method according to claim 1 including fitting the angular piece in the substantially annular recess such that the angular piece is constrained from moving relative to the wheel disc in upward and downward vertical directions relative to the central region.

13. A wheel comprising:
    a stamped wheel disc rotatable about an axis and having an association region transitioning between an end region and a central region, the association region including a first centering element that comprises a substantially annular recess having radially outer and radially inner surfaces with at least one of the radially outer and radially inner surfaces being defined by at least one stamped surface that is obliquely orientated relative to an inboard surface of the association region; and
    a wheel rim having a side wall extending in a direction generally common with the axis and a second centering element extending from the side wall at an angle toward the axis to a distal tip that contacts both of the radially outer and radially inner surfaces of the annular recess, wherein the second centering element is fitted in the substantially annular recess to fix the wheel rim in a centered position relative to the wheel disc.

14. The wheel according to claim 13, wherein the second centering element comprises a triangular projection formed at the distal tip that extends at an angle inward toward the axis, the triangular projection including first and second surfaces that terminate at a sharp point, and wherein the first and second surfaces respectively engage the radially outer and radially inner surfaces of the annular recess.

15. The wheel according to claim 14, wherein the substantially annular recess comprises a triangular shaped recess with the radially outer and radially inner surfaces terminating at a sharp point, and wherein the triangular projection is located in a free end region of the wheel rim and is directly received within the triangular shaped recess to hold the wheel rim fixed in the centered position relative to the wheel disc by preventing upward and downward vertical movement of the triangular projection relative to the wheel disc.

16. The wheel according to claim 13, wherein the wheel rim and the wheel disc are welded together at a weld attachment interface located external to the annular recess and in a vicinity of the first centering element and the second centering element.

17. The wheel according to claim 13, wherein said the distal tip of the wheel rim is defined by an outer rim surface, an inner rim surface, and an edge rim surface that connects the outer rim surface to the inner rim surface, and wherein the outer rim surface and edge rim surface cooperate to define a triangular cross-section, and wherein the distal tip directly engages the first centering element with a portion of the edge rim surface having a non-contact relationship with the wheel disc.

18. The wheel according to claim 13 wherein the association region extends in a generally vertical direction relative to the axis, and including comprising the at least one stamped surface of the substantially annular recess as part of both of the radially outer and radially inner surfaces that are each obliquely orientated relative to the inboard surface of the association region, and wherein the second centering element is fitted in the substantially annular recess to engage both the radially outer and radially inner surfaces such that the second centering element is constrained from moving relative to the wheel disc in upward and downward vertical directions relative to the axis.

19. The wheel according to claim 18 wherein the wheel rim has an outer annular surface and an inner annular surface that are interconnected by an edge, and wherein the second centering element comprises a triangular projection that extends at an angle inwardly toward the axis and which is defined by a first surface formed as part of the outer annular surface and a second surface formed as part of the edge, and wherein the first surface is fitted directly against one of the radially outer and radially inner surfaces and the second surface is fitted directly against the other of the radially outer and radially inner surfaces.

20. A method of manufacturing a wheel disc comprising;
a) stamping a wheel disc; and
b) manufacturing the wheel disc to form at least one first centering element in an association region of the wheel disc, including stamping the at least one first centering element as a substantially annular recess having radially outer and radially inner surfaces with at least one of the radially outer and radially inner surfaces having at least one stamped surface that is obliquely orientated relative to an inboard surface of the association region, and including forming a second centering element at a distal tip of a wheel rim, the second centering element extending at an inward angle from a side wall toward a wheel disc axis of rotation, and including fitting the second centering element in the substantially annular recess to contact both of the radially outer and radially inner surfaces of the annular recess such that the first centering element is capable of fixing the wheel rim in a centered position relative to the wheel disc.

21. The method according to claim 20, wherein the wheel disc axis of rotation comprises a horizontally extending axis and wherein the wheel disc includes a central disc portion, an end region to be associated with a wheel flange, and the association region transitioning between the center disc portion and the end region, wherein the association region extends in a generally vertical direction relative to the horizontally extending axis, and including forming the at least one stamped surface of the substantially annular recess as part of both the radially outer and radially inner surfaces that are each obliquely orientated relative to the inboard surface of the association region, and fitting the second centering element in the substantially annular recess to engage both the radially outer and radially inner surfaces such that the second centering element is constrained from moving relative to the wheel disc in upward and downward vertical directions relative to the horizontally extending axis.

22. The method according to claim 21, wherein the side wall extends in a direction generally common with the horizontally extending axis, and wherein the second centering element comprises the distal tip which forms a triangular piece that extends from the side wall at an oblique angle relative to the side wall and toward the horizontally extending axis.

23. The method according to claim 22, including forming the triangular piece with a first rim surface that intersects a second rim surface at a sharp point at the distal tip, and fitting the triangular piece into the substantially annular recess such that the first rim surface contacts one of the radially outer and radially inner surfaces and the second rim surface contacts the other of the radially outer and radially inner surfaces.

24. The method according to claim 20, further comprising welding the wheel disc to the wheel rim at a weld attachment interface after fixing the wheel rim in the centered position with the first and the second centering elements, and wherein the weld attachment interface is external to the annular recess.

25. The method according to claim 20, wherein the second centering element comprises a triangular projection formed at the distal end of the wheel rim, the triangular projection extending inward toward the wheel disc axis of rotation and including first and second surfaces that terminate at a sharp point that is received within the substantially annular recess.

* * * * *

UNITED STATES PATENT AND TRADEMARK OFFICE
CERTIFICATE OF CORRECTION

| | | |
|---|---|---|
| PATENT NO. | : 7,631,946 B2 | Page 1 of 1 |
| APPLICATION NO. | : 10/513690 | |
| DATED | : December 15, 2009 | |
| INVENTOR(S) | : Francischetti | |

It is certified that error appears in the above-identified patent and that said Letters Patent is hereby corrected as shown below:

Column 7,

Line 30, "wherein said the" should read --wherein the--.

Signed and Sealed this
Twenty-first Day of June, 2011

David J. Kappos
*Director of the United States Patent and Trademark Office*